United States Patent [19]

McBride et al.

[11] 3,758,670

[45]*Sept. 11, 1973

[54] PRODUCTION OF PREDOMINANTLY CRYSTALLINE SOLS

[75] Inventors: John P. McBride, Oak Ridge; Kenneth H. McCorkle, Powell; William L. Pattison, Knoxville, all of Tenn.

[73] Assignee: The United States of America as represented by the United States Atomic Energy Commission, Washington, D.C.

[ * ] Notice: The portion of the term of this patent subsequent to Dec. 21, 1988, has been disclaimed.

[22] Filed: Aug. 1, 1969

[21] Appl. No.: 846,835

Related U.S. Application Data

[63] Continuation-in-part of Ser. No. 814,311, April 8, 1969, Pat. No. 3,629,133.

[52] U.S. Cl. ............................ 423/261, 252/301.15
[51] Int. Cl. ............................................ C01g 43/02
[58] Field of Search ............................ 23/354, 355; 252/301.1 S; 264/0.5

[56] References Cited

UNITED STATES PATENTS

| | | |
|---|---|---|
| 3,375,203 | 3/1968 | Hurley .............................. 252/301.1 |
| 3,288,717 | 11/1966 | Morse .............................. 252/301.1 |
| 3,367,881 | 2/1968 | Morse .............................. 252/301.1 |
| 3,461,076 | 8/1969 | Lloyd et al. ...................... 252/301.1 |
| 3,361,676 | 1/1968 | McBride et al. ............... 252/301.1 S |
| 3,629,133 | 12/1971 | McBride et al. ............... 252/301.1 S |

Primary Examiner—Carl D. Quarforth
Assistant Examiner—R. L. Tate
Attorney—Roland A. Anderson

[57] ABSTRACT

The present invention relates to a method for forming a stable, predominantly crystalline sol from an acid-deficient solution of a hydrous metal oxide in which the metal is in the +4 oxidation state which comprises heating said solution to a crystallizing temperature to cause an increase in conductivity of said solution, removing anion at the crystallizing temperature to a condition of further acid deficiency at a rate which approximates the rate of release of free acid to the aqueous phase of the resultant sol, and then adjusting the anion-to-metal ratio of the sol to a desired anion-to-metal ratio.

2 Claims, 2 Drawing Figures

INVENTORS.
John P. McBride
Kenneth H. McCorkle
William L. Pattison

ATTORNEY.

INVENTORS.
John P. McBride
Kenneth H. McCorkle
William L. Pattison

PRODUCTION OF PREDOMINANTLY CRYSTALLINE SOLS

CROSS-REFERENCE TO RELATED APPLICATION

This application is a continuation-in-part of our co-pending application Ser. No. 814,311, filed Apr. 8, 1969 now U.S. Pat. No. 3,629,133.

BACKGROUND OF THE INVENTION

The invention described herein was made in the course of, or under, a contract with the United States Atomic Energy Commission. It relates to a method for forming crystalline sols from hydrous oxides and to the resulting crystalline sols produced therefrom. More particularly, the present invention is concerned with a method for preparing a predominantly crystalline sol from hydrolyzable salts of a metal which forms hydrous oxides and to the resultant predominantly crystalline sols. By a "predominantly crystalline sol" is meant a sol with a crystalline solid fraction consisting of from 80 to 100 percent of the total solid phase. The method of this invention is of particular utility in forming concentrated predominantly crystalline sols from a hydrolyzable salt of a tetravalent metal selected from the group consisting of zirconium, hafnium, cerium, 5f rare earth metals such as thorium, uranium, and plutonium, and mixtures thereof.

As used in this specification, "true conductivity" is the specific electrical conductivity of the sol or solution in units of millimhos/cm. The term is used to emphasize that the specifications on conductivity are in absolute physical units and are not merely relative readings on an arbitrary scale. In the sol the conductivity is that of the free electrolyte and not the total electrolyte in the system.

"Average crystallite size of a sol" means the apparent crystallite size of calculated from X-ray diffractometer line-broadening data using the Jones B instrument correction method. Copper K$\alpha$ radiation is used and the broadening of the (111), (220), and (311) lines is used. When the three lines do not give the same apparent size, the sizes are averaged (but differences were seldom outside experimental error). The method of calculation is a well standardized part of routine X-ray analysis and is described in X-ray Diffraction Procedures, H. P. Klug and L. E. Alexander, John Wiley and Sons, New York (1954), and in X-ray Diffraction of Polycrystalline Materials, H. S. Peiser, H.P. Rookby, and A.J.C. Wilson, Reinhold Publishing Corporation, New York (1960).

"Degree of crystallinity of a sol" is the fraction of the solid material in the sol which is crystalline. It is determined empirically by comparison of the X-ray diffractometer curve of the sol sample with the curve obtained with a set of standards of known and constant concentration and crystallinity. Calibration curves relating net diffraction peak height over background to the concentration of crystalline oxide were obtained using fully crystalline thoria and urania sols. Comparison of the diffraction peak height over background obtained with a given sol sample with these calibration curves gives by direct interpolation the concentration of crystalline material in the sol sample. The fraction of crystalline material in the sample is then calculated by dividing the concentration of crystalline material by the total concentration of the same material in all forms in the sample. The total concentration (crystalline and amorphous solids) is determined by chemical analysis.

Percent of urania in crystalline form, rather than anorphous or in solution, is determined by either of two methods: 1. Comparison of the X-ray diffractometer trace for the (111) line of the sample with the diffractometer trace for the (111) line of a urania sol which can be shown to be crystalline by agreement between the X-ray diffraction line-broadening particle size and the Brunauer-Emmett-Teller (BET) gas adsorption area of gel prepared from the sol through the equation:

$$A = 6/\rho D$$

where: $\rho$ is the density of the particle,

D is the average particle diameter, and

A is the specific surface area of gel dried from the sol. The contribution of amorphous or soluble metal species to the (111) line pattern is negligible in the concentration ranges studied.

2. Comparison of the X-ray diffractometer trace for the (111) line of the sample with the diffractometer trace for the (111) line of a thoria sol shown to be fully crystalline by BET measurements.

The particular comparison parameter chosen was the net peak height of the diffraction line divided by the background level at lower angles than the line, designated P/B. The X-ray scan is usually run from lower to higher angles of diffraction. By standardizing sample handling and diffractometer operating procedures, a monotonic calibration function of this parameter, P/B, versus U(IV) or Th(IV) molarity of the fully crystalline standard to about ±5 percent level of reproducibility is obtained. The same parameter, P/B, is determined on the sample, and molarity of crystalline metal oxide in the sample is interpolated in the above function.

The calibration curves are empirical and are related to the equipment and sample preparation method used. Therefore, in all determinations a standard is submitted with the sol whose crystallinity is to be determined in order that slight variations from the calibration curves resulting from sample handling, equipment parameters, etc., may be detected and proper corrections made.

Urania standards by method 1 can be used directly when the crystallite size is the same as the sample. Thoria standards by method 2 have the advantage of air insensitivity, however, and therefore are more convenient to handle despite the correction factor required in the calibration function, as described below.

A standardized crystallinity calibration curve as shown in FIG. 1 is obtained with a urania sol which applies when a 1.85 M $ThO_2$ standard sol gives a P/B = 2.9. If P/B for the thoria standard is different from 2.9, then the correct P/B for the sample is calculated from the equation:

$P/B_{UO2\ sol}$ (corrected) = $P/B_{UO2\ sol}$ (uncorrected) − ($P/B_{ThO2\ sol}$−2.9). With the corrected value of $P/B_{UO2\ sol}$ thus obtained, the value of gram moles of crystalline $UO_2$ per liter is determined from the calibration curve. Knowing (from chemical analysis) the gram moles of total $UO_2$ per liter, the percent of crystalline $UO_2$ is simply obtained from the equation:

% crystallinity = crystalline $UO_2$/total $UO_2$ × 100.

The application of a similar method to a quantitative determination of uncombined MgO in Portland Cement appears in a recent publication: *J. Appl. Chem.*, S. S. Rehsi and A. J. Majeindar, Vol. 18, p. 297, October 1968.

"Acid-deficient nitrate solution" is used as a synonym for "anion-deficient salt solution" in which the principal salt is a metal nitrate. This deficiency is taken with respect to the nominal, integral valency of the metal ion; e.g., a solution having a 1-molar concentration of a 4-valent metal ion and having a $HCOO^-$ content of 0.5 M and $NO_3^-$ content of 2.0 M is acid deficient to the extent of 1.5 moles anion/mole of metal is called an acid-deficient nitrate solution because the principal anion is nitrate. Thus, in any acid- or anion-deficient solution, the total anion concentration is less than is stoichiometrically required for the neutral salt.

In its process aspect, the present invention is concerned with an improved method for making metal oxide sols by a liquid-liquid extraction technique to produce sols with a high fraction of crystallinity from an aqueous solution of hydrolyzable metal salts of a metal known to form a hydrous oxide.

The production of aquasols from metal nitrate solutions by liquid-liquid extraction techniques is known and exemplified by the method disclosed in U. S. Pat. application Ser. No. 643,239, now U.S. Pat. No. 3,367,881. According to that method, a hydrous oxide, typified by uranous oxide, is converted from an aqueous nitrate solution containing tetravalent uranium to a sol by contacting said aqueous solution with an aqueous immiscible organic extractant capable of selectively removing nitrate ion from the aqueous phase to produce a nitrate-deficient solution, separating the resulting aqueous and organic phases, followed by digesting the separated aqueous phase. The resultant aged or digested solution is then treated with a second volume of the organic extractant to remove additional nitrate to a nitrate-to-uranium mole ratio of 0.15 ± 0.07. The resultant aqueous sol, or aquasol, is then disengaged from the organic phase and is capable of evaporation to a uranium concentration of no more than about 1.5 molar. Product sols prepared by a sol-forming method of this type were not reproducible in their properties and exhibited widely varying degrees of stability (i.e., uncertain shelf lives).

SUMMARY OF THE INVENTION

Figure 1:
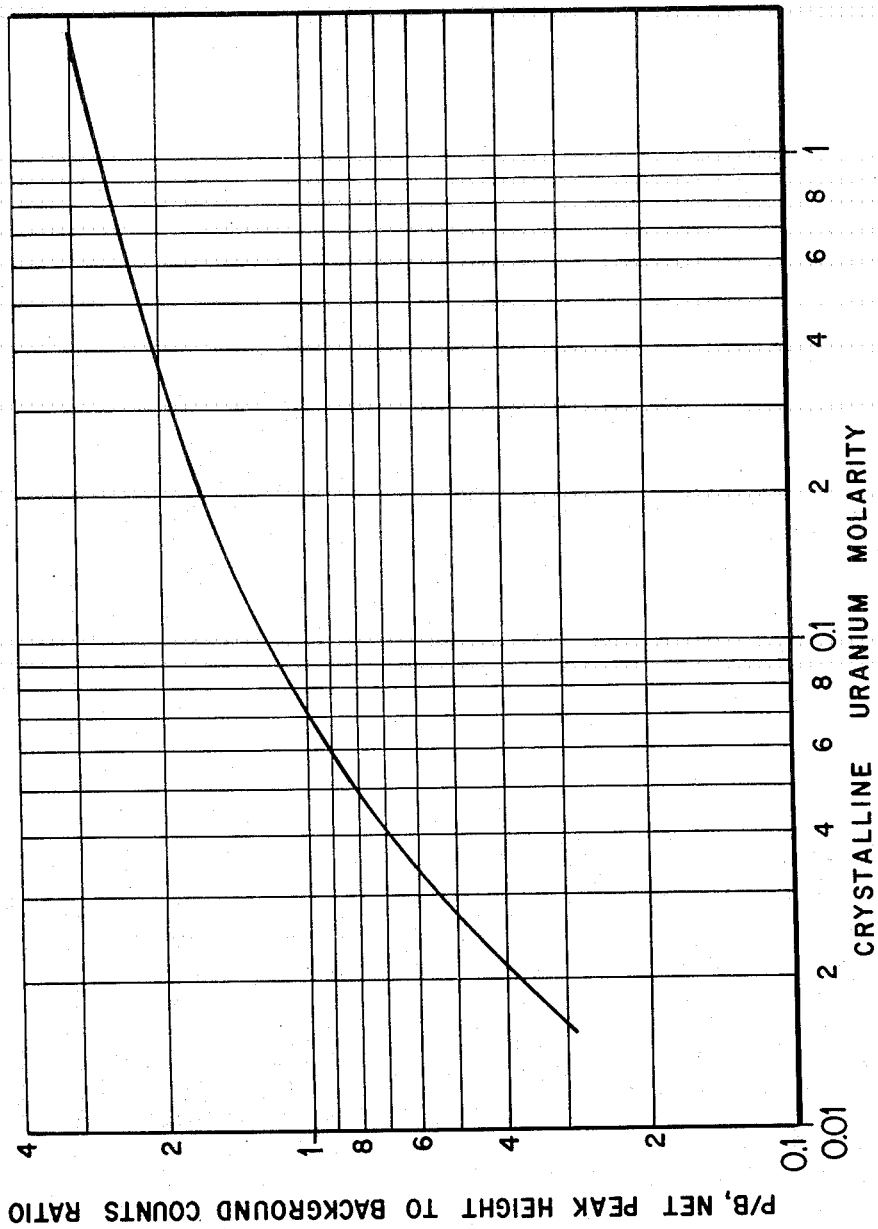
FIG. 1 is an empirically determined calibration curve from which the percent crystallinity of a given urania sol can be determined.

The underlying inventive concept of the product and process aspects of our invention is based on the discovery of the causes of the variation in sol stability and on process means for insuring the formation of a stable sol reproducibly.

We have found that the stability of a sol is related to the fraction of the dispersed oxide which is crystalline. Our findings have shown that that sol which has the highest degree of crystallinity is the most stable sol.

Acting from this discovery, we have been able to define conditions which will form highly crystalline sols in a reproducible manner.

The method by which we form highly crystalline sols in a reproducible manner is based on the discovery that nitrate-deficient solutions of metals which form insoluble hydrous oxides will rapidly form a predominantly crystalline sol over a narrow and critical range of crystallizing temperature if sufficient nitrate is extracted from the aqueous phase at a crystallizing temperature to allow the crystallization process to proceed. If the hydrolyzable ion is readily oxidized (e.g., U(IV)) nitrate removal prevents undue oxidation which, if allowed to proceed, would inhibit crystallization.

In attempting to define the mechanism of sol formation we visualize that, when a sol is formed from a metal nitrate solution of the character described, the acid-deficient aqueous phase contains an aqueous water-soluble inorganic polymer of the hydrous oxide containing nitrate and other anions (e.g., formate) and which will, in the course of time, be converted into a sol. The solid or dispersed phase of the sol which forms initially on nitrate extraction will be found to be predominantly, if not essentially all, amorphous in character and, as time passes, particularly if the aqueous phase containing the dissolved inorganic polymer is aged or digested at an elevated temperature, a small fraction of the polymer is converted to a partially crystalline but still predominantly amorphous sol with an accompanying increase in release of nitric acid to the system. The nitrate still present in the system inhibits further crystallization of the amorphous fraction and, in accordance with this invention, must be removed at the crystallization temperature in order to allow further crystallization to occur. Such a mechanism could explain why sols of varying stability are produced in a process which involves a distinct digestion or aging step. On the other hand, the method of the present invention contemplates the conversion of an acid-deficient nitrate solution directly and rapidly to a predominantly crystalline sol by removing sufficient nitrate at the crystallization temperature, to allow the amorphous polymer to convert to the crystalline state.

The onset of crystallization of the acid-deficient solution is signified by a number of distinctly identifiable signs depending on the system. In the U(IV)-nitrate-formate system, crystallite formation is accompanied by a pronounced gassing, by a sudden rise in the conductivity of the solution, and, generally, by a change in color with development of the dispersed phase. In the uranous nitrate solution or sol, for example, the deep green color of the uranous nitrate solution changes to a black shade, evidencing formation of the uranous oxide crystalline sol. In the thorium(IV) nitrate system, gassing and color changes are not seen, but a marked change in opacity signals the onset of crystallization. In some thorium systems, opacity and color changes are seen, but not gassing. A property change common to all systems at the onset of crystallization is a release of free acid from an inorganic polymer. Hence the onset and cause of crystallization can be charted by monitoring the conductivity of the sol. As soon as a rise in conductivity is noted, the process of this invention calls for rapid nitrate removal, preferably by solvent extraction with an aqueous immiscible organic extractant capable of selectively extracting nitrate ion. The rate of free acid removal should, in the ideal case, be equal to the rate at which free acid is being released. In addition, where U(IV) is the hydrolyzable ion, the rate and amount of nitrate removal should be such as to avoid reaching a free acid level which will cause excessive conversion of uranous species to uranyl species. In general terms, the amount of uranyl formation should never be allowed to exceed more than about 15 percent of the total uranium content and preferably no more than 10 percent. The end of the crystallization process in the case of uranium will be signified by a subsidence or termination of gassing or bubble formation, whereupon further nitrate removal is continued to a conductivity level or free acid content sufficient to stabilize the sol. In the case of uranium, the conductivity should be such as would be measured in a fully crystalline urania sol containing a nitrate-to-uranium mole ratio of 0.1 ± 0.02.

Each acid nitrate-deficient metal nitrate solution will have its characteristic crystallizing temperature range. In the case of uranous nitrate solutions, a crystallizing temperature in the range of 58° to 65°C. is operable, with a preferred narrower range of from 61° to 63°C. The characteristic crystallizing temperature or range of temperature of any hydrolyzable metal salt solution suitable for forming a hydrous oxide sol can be determined by simple experimentation. The minimum crystallizing temperature appears to be characteristic of the particular chemical system. The maximum crystallization temperature is limited by other practical and sometimes critical considerations. For example, the maximum crystallization temperature for urania sols in nitrate media is limited by the increase of the capacity of nitrate to oxidize uranous (+4) to the uranyl (+6) oxidation state with increasing temperature. If, for example, a non-oxidizing anion such as chloride is used, the maximum permissible crystallizing temperature would be governed, not by oxidation considerations, but by practical vapor pressure considerations, i.e., the boiling point of water or of the sol. Even this limitation can be overcome by operating a pressurized system. In some systems such as the Zr(IV) nitrate sol, the minimum crystallizing temperature is above the boiling point of water, thus making it necessary to operate in a pressurized system in order to obtain the desired degree of crystallinity.

In addition to conductivity and temperature control, the time required to produce a given change of conductivity and the time at temperature will determine the degree to which a particular crystallization can be reproduced. For example, the amount of nitrate bound in or on a polymer species at a given conductivity is a function of the nitrate extraction time. In general, the shorter the period of nitrate extraction, the more bound nitrate will remain available for release at the onset of crystallinity. Similarly, the amount of nitrate available for release during crystallinity will determine the degree of conductivity excursion and the rate of nitrate removal during crystallization. However, the optimum times necessary to effect each process step can be determined empirically to define a reproducible process profile.

The sols produced by following the critical operational parameters will be found to have a high degree of crystallinity. For example, uranous oxide sols produced by the method of this invention have consistently been produced with at least 75 percent of the contained solids crystalline. The sols are extremely stable as evidenced by the fact that their conductivity remains virtually constant over long periods, up to months, of time at room temperature. Unstable sols, i.e., those having a high amorphous-to-crystalline ratio (greater than 0.5), change perceptibly and increasingly to higher conductivity to a point where the sol eventually, over a period running to as much as several hours to several days, gels or precipitates due to the increasing generation of free nitric acid in the aqueous phase.

A most significant advantage which accrues from the method of this invention is the production of a truly stable sol relative to sols which have been identified as stable by identifying their nitrate-to-metal mole ratio. The description of a sol by its nitrate-to-metal mole ratio alone is misleading because sol stability is governed, other factors being unchanged, by the free nitric acid rather than the nitrate-to-metal mole ratio. That is to say, as an amorphous sol crystallizes, it releases adsorbed or otherwise bound anions into the surrounding solution. The shift of nitrate and/or other anions from the bound state to the free acid state occurs with no change in over-all nitrate-to-metal ratio in the sol, but it does lead to sol thickening, gelling, or to precipitation, depending on how much electrolyte is freed and how long it has been freed. On the other hand, the nitrate-to-metal ratio of a predominantly or, in the ultimate case, a fully crystalline sol is related directly to the conductivity of that sol and is an accurate index of stability since there is little anion (i.e., nitrate) released from the sol as it ages. For example, a typical, predominantly crystalline sol prepared in accordance with our invention underwent a change in conductivity of about 1,500 $\mu$mhos/cm on aging 5.3 months at room temperature. On the other hand, a sol having a predominantly amorphous fraction underwent a change in conductivity of 6,500 $\mu$mhos/cm in only two months.

The availability of a truly stable sol represents a significant advantage to those users who manufacture microspheres from sols, as typified by the hydrous oxide gel microsphere process described in U. S. Pat. application Ser. No. 385,813 of common assignee now U.S. Pat. No. 3,290,122 in which inorganic microspheres are formed from a "stable" hydrous sol by introducing a fine stream of said hydrous sol and a surrounding stream of a dehydrating organic liquid from said sol into a droplet-forming and congealing zone. The congealed microspheres are then fired to high density. The congealed microspheres undergo considerable shrinkage in their conversion to the solid densified microsphere. Much difficulty has been experienced where sols containing a large amorphous fraction have been used. One of the principal difficulties encountered is cracking of the spheres when they are fired to density. Manufacturers have been plagued with this problem, since they have found no way, at least prior to this invention, to standardize the quality of their starting material except in terms of relying on the nitrate-to-metal ratio of the starting sol which, as previously described, frequently does not reflect the true nature of the sol. By practicing the process of this invention it will be clear that there is now provided a predominantly crystalline sol whose conductivity accurately reflects its nitrate content and indicates the optimum nitrate level for sol stability. With such a starting sol, then, microsphere manufacturers can develop microsphere-forming techniques and firing schedules which can avoid, or at least considerably reduce, the incidence of cracking and shattering resulting from the use of sols having a deleteriously high amorphous fraction.

A typical apparatus set-up for conducting the process of this invention comprises a first vessel for containing the starting feed solution, a second vessel for regenerating the nitrate-loaded extractant consisting of an aqueous solution 1 molar in sodium carbonate and 1 molar in sodium hydroxide, and a water wash vessel for removing any entrained regenerating solution. Lines are provided for conducting fluid from the first vessel to the second and the second to the third, a return line from the third vessel for recirculating the amine extractant to the first, and a pump for circulating the amine extractant. Continuous nitrate extraction is performed by recirculating the amine reagent through the entire system with continuous regeneration of the nitrate-loaded amine. The rate of nitrate removal from the sol-forming aqueous feed solution is controlled by varying the pumping rate. The probe (CDC-104) of a Radiometer Type CDM 2d conductivity meter (Copenhagen) is maintained in the extraction vessel to monitor the conductivity of the solution as it forms a sol.

Figure 2:
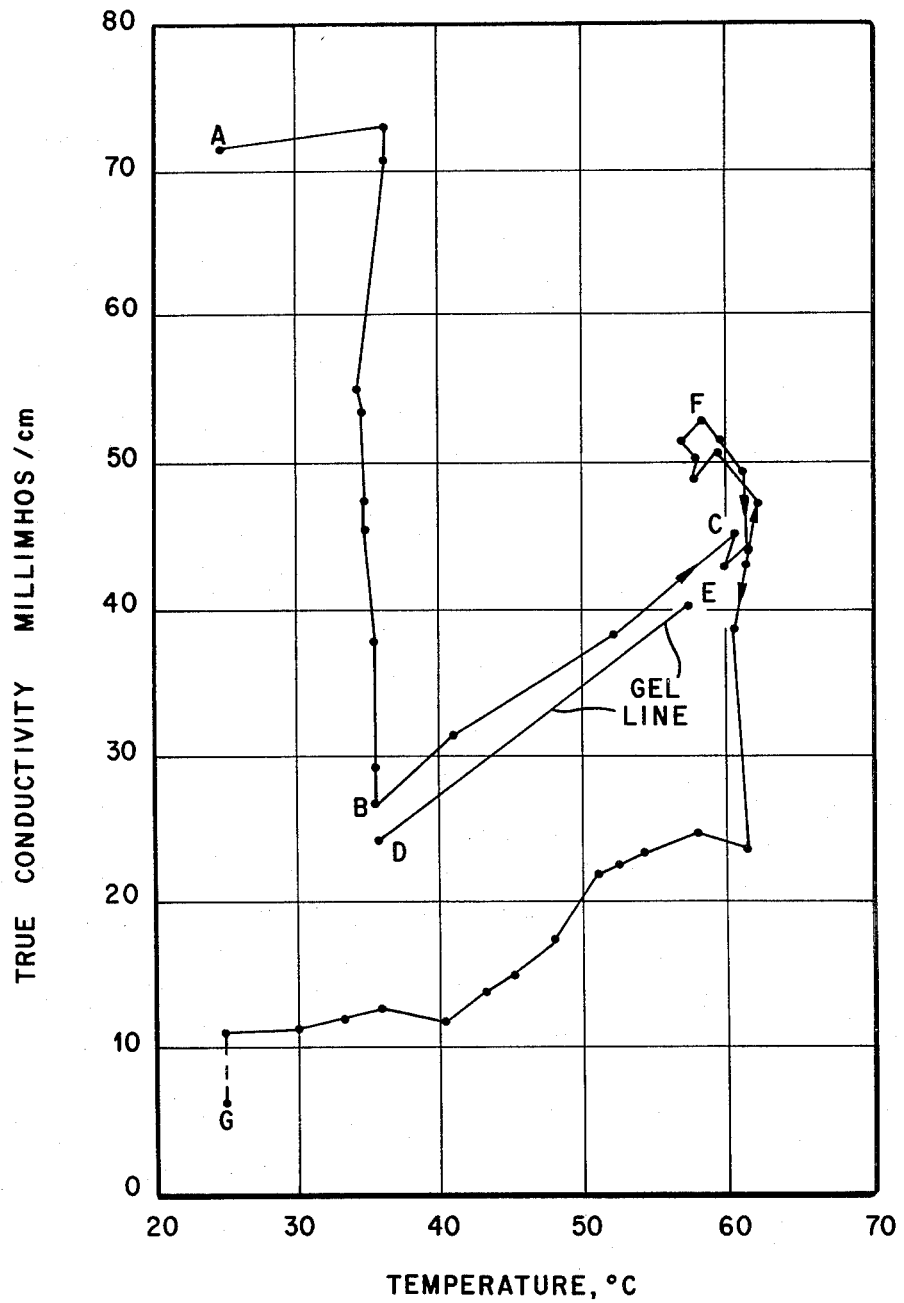
FIG. 2 is a typical conductivity-temperature profile developed for a uranous nitrate solution as it is processed to a crystalline sol.

Each aqueous nitrate feed solution will generate its own characteristic conductivity-temperature profile and, before a production run, this characteristic conductivity-temperature profile must be predetermined. Such a profile is shown in FIG. 2, which represents a typical conductivity-temperature profile developed for a uranous nitrate solution as it proceeds to form a crystalline sol. Assuming the several solutions to be in their respective containers, with a protective atmosphere above each solution to prevent air oxidation of the sol, the extraction pump is turned on. In a short time, ranging from 60 to 120 minutes, the conductivity of the feed nitrate solution is taken down from point A, its initial conductivity, to point B, just above a gel line D-E, to convert the initial feed solution to a nitrate-deficient condition. Any point above the gel line D-E represents a condition prior to crystallization which assures that the system is fluid and that a gel is not formed. From this point the acid-deficient solution or sol is then heated at a rate of about 1°C./minute to the crystallization region, 58°–65°C., adjusting the nitrate extraction as needed to maintain the conductivity above the gel line. Nitrate extraction is then continued or accelerated to promote crystallization. The onset of crystallization will be recognized by a sudden gas evolution and a color conversion from the characteristic dark green color of a uranous nitrate solution to a black color, signifying the formation of the desired crystalline sol. As crystallization proceeds, the rate of nitric acid release from the polymer may exceed the extraction rate and the conductivity is seen to rise to point F. Without rapid and continuous nitrate extraction, however, the buildup of free nitric acid, and hence the conductivity, would increase to such an extent as to cause excessive oxidation of uranous species to uranyl species and inhibit crystallization. According to this invention, however, the conductivity excursion is controlled and minimized by increasing the pumping rate of the extraction liquid to a rate which effectively matches the rate of nitrate release to cause the nitrate concentration to hover about the region of crystallization. Pumping is continued at that rate until gas evolution has terminated, whereupon the nitrate extraction is conducted along the path F-G while reducing the temperature of the aqueous phase. The end point G represents a conductivity value corresponding to a nitrate-to-uranium ratio of 0.10 ± 0.02, the optimum nitrate concentration desirable for maintaining stable U(IV) sols. Once a conductivity-temperature profile has been predetermined for a given system, it can then be used as the reference profile for producing a predominantly crystalline sol in a reproducible manner for that system.

It should be emphasized that the point F does not represent the full extent of nitrate release that normally occurs during crystallization of the sol. It represents, rather, a controlled process of nitrate removal which permits formation of a predominantly crystalline sol. Without extraction during crystallization, the conductivity would rise to a level which would prevent conversion to a predominantly crystalline stable sol.

The organic phase used in practicing the invention comprises an organic solvent and an amine selected from primary, secondary, and tertiary amines having at least 10 carbon atoms in the molecule. The tertiary amines ordinarily extract more uranium together with the nitrate than do the other amines and therefore are less desirable extractants than primary or secondary amines. The organic solvent may be any of the compounds normally used as a diluent for amines in liquid-liquid extraction processes; for example, the aliphatic hydrocarbons, aromatic solvents, aromatic petroleum fractions, ketones, nitrohydrocarbons, or chlorinated solvents. The primary, secondary, and tertiary amines and diluents described as useful in U. S. Pat. No. 2,877,250, issued Mar. 10, 1959, in the name of Keith B. Brown et al., for "Recovery of Uranium Values," are useful in our process. Other anion removal methods, for example, ion-exchange, dialysis and solvent extraction with other reagents may be used as alternate techniques for effecting nitrate removal to produce a predominantly crystalline sol.

The following example illustrates specific embodiments of the invention as applied to the conversion of uranous nitrate solutions to crystalline sols. It should be noted, however, that the invention is applicable to the formation of crystalline sols from other metal nitrate solutions in which the metal is in the +4 oxidation state and further characterized by its propensity to form hydrous oxides of the class previously described. In other words, the specific operating parameters for any metal-nitrate system within the class defined can be determined in a routine manner following the principles and instructions herein disclosed to define a characteristic conductivity-temperature profile which, in effect, characterizes a reproducible operational path for that system to produce a predominantly crystalline sol.

EXAMPLE

A 1,500-cc aqueous solution of 1.3 M U(IV), 2.6 M $NO_3^-$, and 0.6 M HCOOH was extracted with an organic solution consisting of a 0.25 M solution of n-lauryltrialkylmethylamine (m.w. 365) extractant a diluent comprising 75% diethylbenzene - 25% n-paraffin (average m.w. 170). The presence of formic acid has been found to reduce the tendency of the aqueous phase to emulsify in contact with the organic phase, and thus result in more clean-cut separation of the aqueous phase. The amine extraction system comprised four cylindrical settler vessels: a solvent extraction vessel containing the U(IV) solution, a regeneration vessel containing an aqueous solution 1 molar in $Na_2CO_3$ and 1 molar in NaOH concentration, a water wash vessel, an extractant reservoir, and an extractant pump. All vessels were under a protective argon temperature to prevent oxidation of U+4.

The probe of a Radiometer Type CDM-2d conductivity meter (Copenhagen) was maintained in the aqueous phase in the extraction vessel. Continuous extraction was performed by recirculating the amine reagent through the entire system with continuous regeneration. The rate of nitrate removal was controlled by varying the pumping rate.

The conductivity limits for gelation at given temperatures and the optimum temperature for crystallization were established for this system.

The U(IV) nitrate solution was extracted, beginning at 25°C. During an initial extraction of nitrate the conductivity dropped from 72 to 27 millimhos/cm during extraction, while the temperature increased from 25°C. to 35°C. The temperature was gradually increased at a rate of 1°C. per minute, while extraction was controlled at a rate sufficient to permit conductivity to increase minimally above the gelation point. It was found that an increase of 1 millimho/cm per 1°C. increase in temperature in the range of 35°–60°C. prevented gelation and substantially minimized U(VI) formation.

At about 61°C. and 45 millimhos/cm, nitrate extraction was increased, reducing the conductivity to 43 millimhos and promoting crystallization. Nitrate was released at an accelerated rate, thus causing the conductivity to rise rapidly. Continued nitrate extraction at an accelerated pumping rate reduced the conductivity back to the original conductivity of 45 millimhos/cm.

Nitrate extraction was continued at 60°–62°C. to a conductivity of 24 millimhos/cm after which the system was allowed to cool to room temperature. The conductivity decreased to 11 millimhos/cm at 25°C. Nitrate extraction as performed at 25°C., after cooling overnight, to provide a conductivity of about 7 millimhos/cm, indicating a nitrate-to-uranium ratio of 0.10 ± 0.02, the optimum concentration desirable for stable u(IV) sols made by this method.

The properties of the sol thus prepared were as follows:

| | |
|---|---|
| U concentration (molar) | 1.39 |
| U(IV) content (%) | 89 |
| $NO_3/U$ mole ratio | 0.10 |
| Density (g/cc) | 1.353 |
| Shelf life (with no gelation) | 5 months |
| Change in conductivity over 5 months at room temperature | 1.3 millimhos/cm |
| Crystallinity (%) | 100 |
| Surface area m²/gram of dried gel formed from sol | 136 |

The general procedure was repeated using various starting solutions containing 0.9 to 1.3 M uranous nitrate, 1.8 to 2.6 M $NO_3^-$, and 0.45 to 0.65 M HCOOH. A description of the final sols produced is summarized in Table I below.

TABLE I

| Sol No. | Total U Conc. | U(IV) Content | $NO_3^-$/U Mole Ratio | $HCOO^-$/U Mole Ratio | % Crystallinity[a] |
|---|---|---|---|---|---|
| 1 | 1.38 | 89 | 0.10 | 0.48 | 100 |
| 2 | 1.05 | 87 | 0.22 | 0.40 | 96 |
| 3 | 0.93 | 89 | 0.13 | 0.43 | 81[b] |
| 4 | 1.32 | 85 | 0.15 | 0.41 | 79[c] |
| 5 | 1.47 | 84 | 0.21 | 0.36 | 77 |

[a] X-ray crystallite sizes 39±1 A.
[b] Sol density was 1.239 g/cc; sol conductivity change over 3 months was 3.4 millimhos/cm.
[c] Sol density was 1.342 g/cc; sol conductivity change over 3.7 months was 3.4 millimhos/cm.

All of these sols were stable over several months. Moreover, the highly crystalline sols could be concentrated up to 3.5 M without any tendency to congeal or gel. In the case of sols, molarity means gram molecular weight of metal oxide per liter of sol.

Electron photomicrographs of the solid phase of sols prepared by the method of our invention show the existence of micelles consisting of uniform spherical agglomerates of crystallites several hundred angstoms in size, while X-ray diffraction line-broadening measurements indicate a considerably smaller average crystallite size. Thus, whereas the solid phase of a 1-M urania sol prepared by the method of our invention indicated an average crystallite size of 40 A as measured by X-ray line broadening, the actual micelles displayed on an electron photomicrograph of said solid phase showed the existence of uniform agglomerates of from 250 to 300 A in size composed of many crystallites. X-ray diffractometry measurements showed the sol to contain 100 percent crystalline solids.

Dense spheroidal particals are readily produced from the sol products. In one case, a fully crystalline (100%) 1-M urania sol, as prepared by the method of this invention, and a sol prepared by concentrating the original 1-M sol to 3 M were converted to spheroidal particles by gelation in a drying solvent and then to densified particles by subsequent drying and firing in accordance with the general procedure described in previously mentioned Ser. No. 385,813 now U.S. Pat. No. 3,290,122 of common assignee. Selected properties of the fired spheroidal particles are presented in Table II below.

TABLE II

| Sol | Final O/U | C, percent | Density (g./cc.)[1] | | Spheroid size (μ) | Average crush strength (g.) |
|---|---|---|---|---|---|---|
| | | | 15 p.s.i. | 15,000 p.s.i. | | |
| 1 M | 2.003 | <0.002 | 10.78 | 10.81 | 300–350 | 614 |
| 3 M | 2.005 | 0.003 | 10.53 | 10.60 | 350–400 | 746 |

[1] Measured by Hg intrusion.

What is claimed is:
1. A method of forming a stable, predominantly crystalline sol of urania which comprises:
   a. heating and acid-deficient solution of uranous nitrate to its crystallizing temperature;
   b. removing free nitrate ion at a temperature in the range 58°–65°C. at a rate which approximates the rate of nitrate release to the aqueous phase of the resulting sol to promote crystallization while maintaining at least 85 percent of the total uranium in said sol in the +4 oxidation state; and
   c. thereafter adjusting the nitrate-to-uranium mole ratio at a level sufficient to maintain the sol.
2. The method according to claim 1 in which the adjusted nitrate-to-uranium mole ratio is in the range 0.08–0.22.

* * * * *